(12) United States Patent
Miura

(10) Patent No.: US 8,245,110 B2
(45) Date of Patent: Aug. 14, 2012

(54) ERROR CORRECTING CODE GENERATION METHOD AND MEMORY CONTROL APPARATUS

(75) Inventor: Takashi Miura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1023 days.

(21) Appl. No.: 12/182,732

(22) Filed: Jul. 30, 2008

(65) Prior Publication Data

US 2009/0031188 A1 Jan. 29, 2009

Related U.S. Application Data

(63) Continuation of application No. PCT/JP2006/301590, filed on Jan. 31, 2006.

(51) Int. Cl.
*G06F 11/00* (2006.01)

(52) U.S. Cl. ........................................ 714/766

(58) Field of Classification Search ................ None
See application file for complete search history.

(56) References Cited

U.S. PATENT DOCUMENTS

| | | | |
|---|---|---|---|
| 4,298,929 A | 11/1981 | Capozzi | |
| 4,768,197 A | 8/1988 | Petolino et al. | |
| 5,664,148 A | 9/1997 | Mulla et al. | |
| 7,203,890 B1 * | 4/2007 | Normoyle | 714/768 |
| 7,392,456 B2 * | 6/2008 | Leung et al. | 714/763 |
| 7,617,437 B2 * | 11/2009 | Moyer | 714/763 |
| 7,836,262 B2 * | 11/2010 | Gunna et al. | 711/143 |
| 7,930,615 B2 * | 4/2011 | Kohler et al. | 714/763 |
| 2002/0124143 A1 | 9/2002 | Barroso et al. | |
| 2004/0003174 A1 | 1/2004 | Yamazaki | |

FOREIGN PATENT DOCUMENTS

| | | |
|---|---|---|
| EP | 0 013 737 | 8/1980 |
| JP | 52-98434 | 8/1977 |
| JP | 58-21353 | 4/1983 |
| JP | 60-3046 | 1/1985 |
| JP | 61-199141 | 9/1986 |
| JP | 63-231553 | 9/1988 |
| JP | 1-134548 | 5/1989 |
| JP | 4-60734 | 2/1992 |
| JP | 10-232789 | 9/1998 |
| JP | 2004-38341 | 2/2004 |

OTHER PUBLICATIONS

Jin-Fu Li et al, "An Error Detection and Correction Scheme for RAMs with Partial-Write Function", Aug. 3, 2005, Memory Technology, Design, and Testing, 2005, MTDT 2005, 2005 IEEE International Workshop on Taipei, Taiwan, Aug. 3-5, 2005, pp. 115-120.
European Search Report mailed Jul. 1, 2009 and issued in corresponding European Patent Application 06712733.2.
European Office Action dated Jan. 25, 2010 issued in corresponding European Patent Application 06 712 733.2.
Japanese Office Action issued on Apr. 14, 2009 in corresponding Japanese Patent Application 2007-556737.
European Office Action dated Dec. 29, 2011 for corresponding European Application No. 06712733.2.

* cited by examiner

*Primary Examiner* — Michael Maskulinski
(74) *Attorney, Agent, or Firm* — Fujitsu Patent Center

(57) ABSTRACT

An objective of the present invention is to make it possible to appropriately correct an error of data in a cache memory. A store processing unit generates an nt-ECC on the basis of data stored in a non-target area that was read out from a cache memory with a search of the cache memory, and generates t-ECC on the basis of the data to be stored in the buffer.

12 Claims, 17 Drawing Sheets

ERROR CORRECTING CODE GENERATION METHOD AND MEMORY CONTROL APPARATUS

CROSS REFERENCE TO RELATED APPLICATION

This application is a continuation application of international PCT application No. PCT/JP2006/301590 filed on Jan. 31, 2006.

BACKGROUND OF THE INVENTION

1. Technical Field

The present invention relates to a memory control apparatus and a generation method of an error correcting code for data to be written into a cache memory.

2. Description of the Related Art

It has come into practice to store, in a cache memory, data read out from a main memory so as to accelerate the processing speed of a CPU by accessing the data in the cache memory. An error correcting code is attached to the data in the cache memory in order to protect the data.

Patent Document 1 describes writing, into a memory, pieces of data having a size smaller than the data width from which a check bit can be generated, by merging the pieces of data into a single piece of data using a multiplexer, generating a check bit from the data using an ECC generation unit, and writing it into the memory. It has an effect of shortening the access time with a read-modify-write action in a partial write operation.

Patent Document 2 describes a partial write action crossing a double-word boundary, performed by storing data from a channel in a swap buffer when there is no corresponding address in a cache, merging a double-word related to the partial write action and the data from the channel in the swap buffer, and writing it into a main memory.

FIG. 16 is a diagram describing a conventional of an error correcting code generation method in a memory system comprising a data RAM and an ECCRAM.

When an instruction processing unit (not shown in the figure) outputs a store instruction, whether or not data to be stored exists in a data RAM (cache memory) 13 is checked. When the data to be stored exists, 8-byte data including the data to be stored is read out and checked for an error. At this time, the store data corresponding to the store instruction is written into a store buffer STB 11.

Next, when the instruction processing unit issues a store permission, the data in the store buffer STB 11 is written into a write buffer WB 12, and the data is further written into the data RAM 13. At the same time with the writing, 8-byte data is read out from the data RAM 13, and an error correcting code ECC 1 is generated from the data stored in a non-target area in the is 8-byte data. Another error correcting code ECC2 is then generated from the data stored in the target area in the 8-byte data. The two ECCs are merged to generate an error correcting code ECC for the stored and updated data, and the generated ECC is stored in an ECC RAM 14.

The conventional error correcting code generation method described above has the following problems.

When an error is not detected in the error check performed when the cache memory is searched in response to a store instruction, and detected in the error check performed for the data read out after the data is written into the cache memory, an error correcting code for the data after the writing cannot be generated appropriately. The error correcting code stored in the ECCRAM 14 is the one generated from the data before the store instruction is realized, and the data before the realization of the store instruction no longer exists at this time. Therefore, there occurs an error that even when an error is detected, it is impossible to correct the 1-bit error in the data.

One of the causes of the error described above is that in the case of writing and readout to/from a SRAM (Static Random Access Memory), when the readout is performed immediately after the writing, the data in the state immediately before the readout remains on a bit line, decreasing the readout margin of the next cycle. The structure is designed in such a way that the bit line is charged up to the power voltage VDD within a predetermined time using a precharge transistor, so that data does not remain after the writing. Specifically, the writing into a memory cell is performed while setting, to a low level, one in a bit line pair connected to the memory cell. After the completion of the writing, the written data is purged before the start of writing in the next cycle, by shorting the bit line pair at the power voltage VDD.

However, an error occur with the readout in the next cycle, when the SRAM is operated at an operation cycle exceeding the originally designed cycle, or when the bit line pair cannot be precharged up to the power voltage VDD due to the poor characteristic of the precharge transistor caused by the variation in the manufacture quality of the transistor.

[Patent Document 1] Japanese Unexamined Patent Application Publication No. 10-232789

[Patent Document 2] Japanese Examined Patent Application Publication No. 58-21353

SUMMARY OF THE INVENTION

An objective of the present invention is to make it possible to appropriately correct an error of data in a cache memory.

A memory control apparatus according to the present invention comprises a buffer for storing data to be stored in a store instruction; a judgment circuit for searching a cache memory to judge whether or not the data to be stored exists in the cache memory; a first error correcting code generation circuit for, when the data to be stored exists in the cache memory according to the judgment performed by the judgment circuit, generating a first error correcting code on the basis of data other than the data to be stored that was read out from the cache memory with the search of the cache memory and storing the generated first error correcting code in the buffer; a second error correcting code generation circuit for generating a second error correcting code on the basis of the data to be stored in the buffer; and a merge circuit for generating an error correcting code for the data by merging the first error correcting code and the second error correcting code.

According to the invention, an error of data can be corrected appropriately even when the error is detected after the data is written into a cache memory, by using an error correcting code generated from a first error correcting code generated from the data other than the data to be stored that was read out from a cache memory with the search of the cache memory, and a second error correcting code generated from the data to be stored.

In a memory control apparatus according to the present invention, the first error correcting code generation circuit performs a judgment as to whether or not a store address in a preceding store instruction corresponds to a store address in a current store instruction, and a judgment whether or not a data width of store data in the current store instruction corresponds to a predetermined data width, and when a preceding store instruction having the same store address exists and the data width of the data in the current store instruction is smaller than the predetermined data width, ECC validity information showing whether or not the first error correcting code is appropriate is set as invalid, associated and stored with the data and the first error correcting code.

The above configuration makes it possible to determine whether or not the first error correcting code is appropriate, by judging whether the ECC validity information is set as valid or invalid.

In a memory control apparatus according to the present invention, the buffer comprises a plurality of buffers; and a judgment as to whether or not a same store address exists in the plurality of the buffers and a judgment whether or not a data width of the data in a current store instruction correspond to a predetermined data width are performed, and when the same store address exists in the plurality of the buffers and the data width of the data in the current store instruction is smaller than the predetermined data width, the ECC validity information is set as invalid, associated with the data and the first error correcting code, and stored in the store address in the corresponding buffer.

The above configuration makes it possible to generate an appropriate error correcting code, when the same store address exists in a plurality of buffers and when the data width of the data in the current store instruction is smaller than the predetermined data width by generating the first error correcting code after the preceding store instruction is completed, and by using the second error correcting code generated from data to be stored.

In a memory control apparatus according to the present invention, the merge circuit performs a judgment as to whether the ECC validity information is set as valid or invalid, and when the ECC validity information is set as valid, the first error correcting code and the second error correcting code are merged to generate an error correcting code for the data.

The above configuration makes it possible to generate an appropriate error correcting code, when the ECC validity information is set as valid with the first error correcting code having been generated appropriately, by merging the first error correcting code and the second error correcting code.

In a memory control apparatus according to the present invention, when a preceding store instruction is completed while the ECC validity information of the buffer is set as invalid, the ECC validity information in the corresponding store address in the buffer is changed and set as valid.

The above configuration makes it possible, even when a preceding store instruction for writing data into the same address exists, to write the store data in the following store instruction into a cache memory without causing waiting time for the process after the completion of the preceding store instruction.

DESCRIPTION OF THE PREFERRED EMBODIMENT

Figure 1:
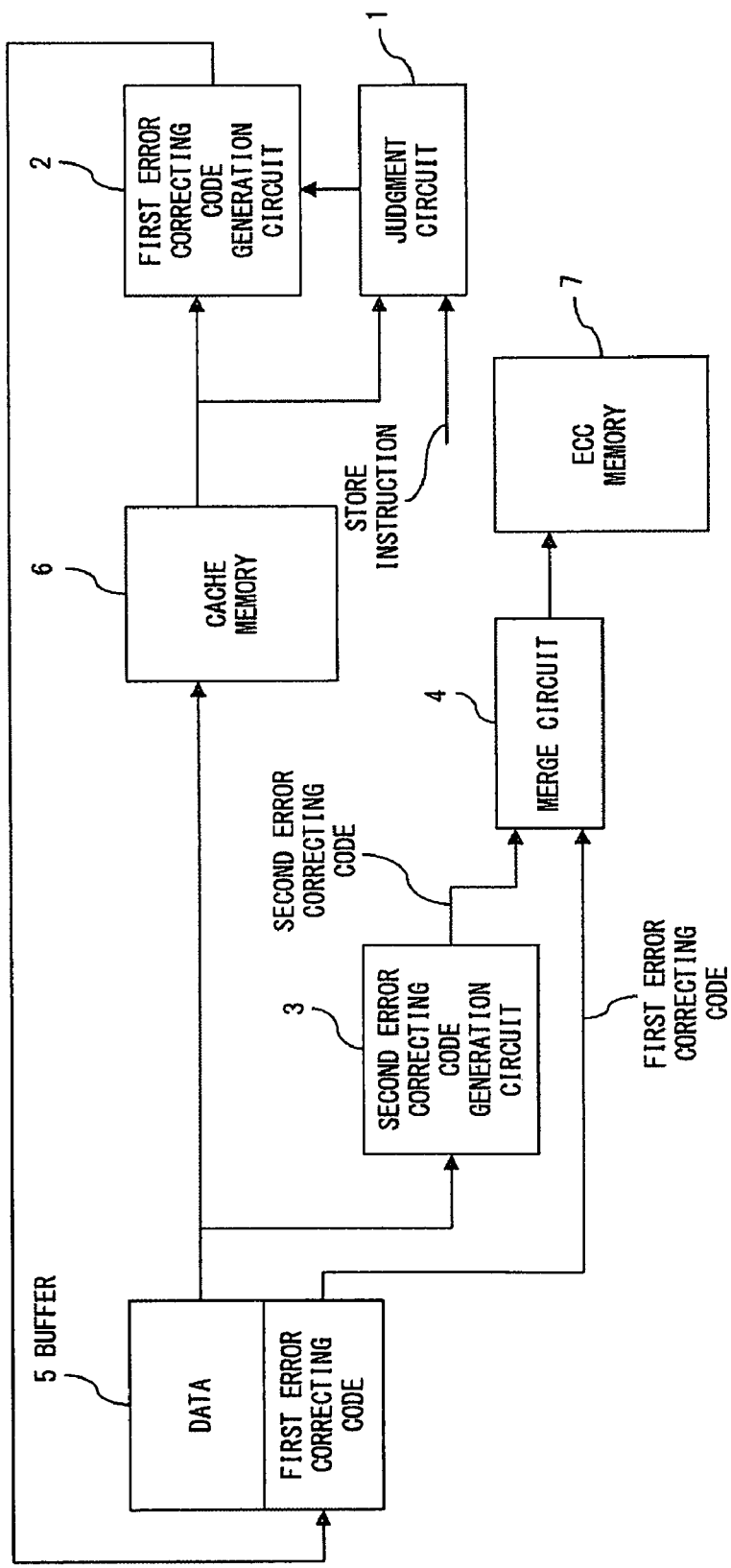
FIG. 1 is a diagram showing a basic configuration of a memory control apparatus.

An embodiment of the present invention is described below, referring to the drawings. FIG. 1 is a diagram showing a basic configuration of a memory control apparatus which operates in accordance with an error correction code generation method according to the embodiment of the present invention.

In FIG. 1, the memory control apparatus comprises a judgment circuit 1, a first error correcting code generation circuit 2, a second error correcting code generation circuit 3, a merge circuit 4 and a buffer 5.

Store data in a store instruction is stored in the buffer 5. The judgment circuit 1 searches a cache memory 6 to judge whether or not the data to be stored in the store instruction exists in the cache memory 6.

The first error correcting circuit 2 generates, when the data to be stored exists in the cache memory 6 according to the judgment performed by the judgment circuit 1, a first error correcting code on the basis of the data stored in a non-target area (data other than the data to be stored) that was read out from the cache memory 6 with the search of the cache memory 6.

The second error correcting code generation circuit 3 generates a second error correcting code on the basis of the data stored in a target area in the buffer 5.

The merge circuit 4 merges the first error correcting code and the second error correcting code to generate an error correcting code for the store data, and writes it into an ECC memory 7.

In the memory control apparatus described above, the error correcting code is generated by merging the first error correcting code generated from the data stored in the non-target area that was read out with the search of the cache memory 6 and the second error correcting code generated from the store data to be written into the cache memory, making it possible to appropriately correct the error of the data (for example, a 1 bit error), even when an error is detected after the data is written into the cache memory.

While readout from the cache memory 6 was conventionally required twice, i.e. with the search and with the generation of the first error correcting code after the store is permitted, this embodiment requires the readout from the cache memory 6 only once, for the data check with the search and the generation of the first error correcting code.

Figure 2:
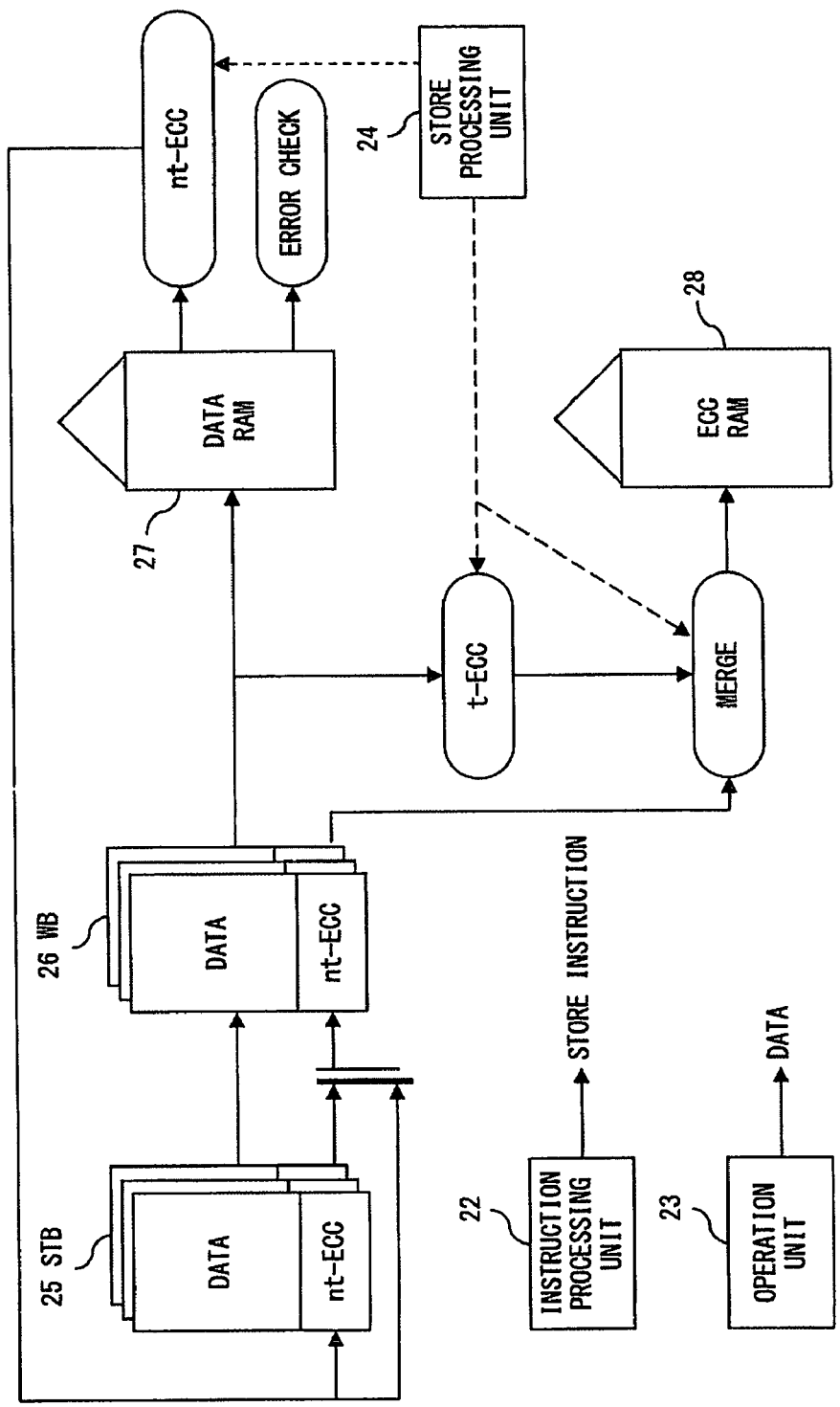
FIG. 2 is a diagram describing an error correcting code generation method according to the embodiment.

Next FIG. 2 is a diagram describing an error correcting code generation method according to the embodiment. The embodiment relates to a CPU which comprises a cache memory and realizes an instruction in the pipeline system.

When an instruction processing unit 22 issues a store instruction and an operation unit 23 outputs store data, a store processing unit 24 generates a store byte mark STBM on the basis of store information in the store instruction, and stores it, in a store buffer 25, with a store address. The store byte mark STBM is data showing which byte is to be stored, in data having a predetermined width (in the embodiment, 8 bytes), which is generated for each byte.

The store information in the store instruction comprises a store address, store data width, alignment information determining whether to store the data left-aligned or to store the data right-aligned, and the like.

The store processing unit 24 judges whether or not a cache line to be stored exists in a data RAM (cache memory) 27. It further judges whether or not the store address in a preceding store instruction and the store address in the current store instruction correspond, and whether or not the data width of the store data in the current store instruction corresponds to a predetermined data width. When a preceding store instruction having the same store address exists and the data width of the store data in the current store instruction is smaller than the predetermined data width, the current store instruction is set as an object of Store-Store-Interlock SSI, since the nt-ECC generated from the data stored in the non-target area cannot be determined until the preceding store instruction is completed. The Store-Store-Interlock applied to the store instruction that has been determined as the object of Store-Store-Interlock is cancelled when the store operation in the preceding store instruction is completed.

The store processing unit 24 calculates an error correcting code nt-ECC (corresponding to the first error correcting code) from the data stored in the non-target area that was read out from the corresponding address in the data RAM 27 with the search of the data RAM 27, and writes it into the store buffer 25 with the store data output from the operation unit 23. At this time, if the current store instruction is set as the object of Store-Store-Interlock, the nt-ECC cannot be obtained appropriately until the preceding store instruction is completed. In this case, ECC validity information ECC-VAL is set as invalid (for example, "0"). In the other cases, the ECC validity information is set as valid (for example, "1").

Figure 3A:
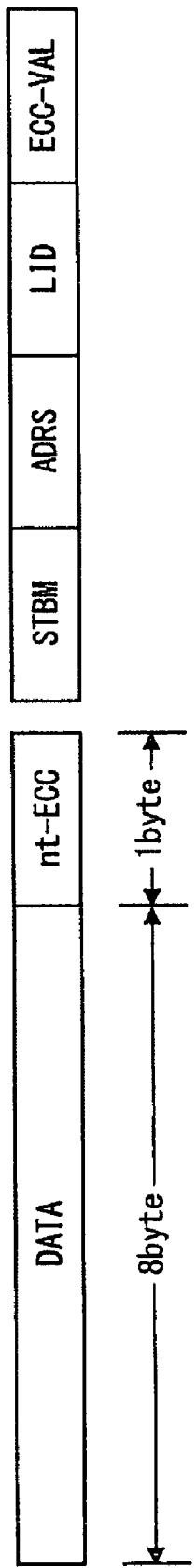
FIGS. 3A and 3B show the data structure in a store buffer and a write buffer.
Figure 3B:
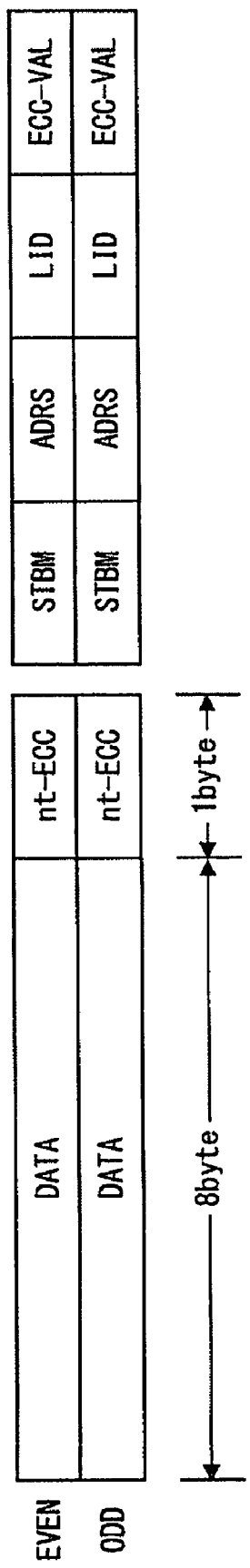

FIG. 3A, 3B show the data structure in the store buffer 25 and a write buffer 26.

As shown in FIG. 3A, each address in the store buffer 25 is associated with, and stores, 8-byte data, a 1-byte nt-ECC being the error correcting code for the 8-byte data, a store byte mark STMB showing the byte corresponding to the data to be stored, a store address ADRS, an LID showing the presence or absence of a cache hit, and ECC validity information ECC-VAL. In the case of a cache hit, "1" is set to the LID. In the case of a cache miss, "0" is set to the LID. The ECC validity information is information showing whether or not an appropriate nt-ECC is stored in the store buffer 25. When a preceding store instruction exists for the same store address, and the data width of the store data is smaller than 8 bytes, the nt-ECC cannot be generated appropriately until the preceding store instruction is completed. In this case, the ECC validity information ECC-VAL is set as invalid ("0"). In the other cases, it is se as valid ("1").

As shown in FIG. 3B, the addresses in the write buffer are divided into (EVEN) addresses and (ODD) addresses, respectively storing 8-byte data, a 1-byte nt-ECC, a store byte mark STEM, a store address ADRS, an LID, and ECC validity information ECC-VAL.

Referring back to FIG. 2, the store processing unit 24 receives store permission from the instruction processing unit 22, and writes the data in the store buffer 25 into write buffer 26. When the ECC validity information in the write buffer 26 is set as valid ("1"), and, the LID is also "1", the corresponding store data is read out from the write buffer 26, and an error correcting code t-ECC (corresponding to the second error correcting code) is generated on the basis of the read-out store data. The generated t-ECC and the nt-ECC stored in the write buffer 26 are then merged and the resultant of the merger is written into an ECCRAM 28.

Next, the error correcting code generation method according to the embodiment is described in greater detail. In the following descriptions, the operation through which an error correcting code is generated by the store processing unit 24 and written into the ECCRAM 28 is explained, dividing the operation into four parts, i.e. IU-REC (Instruction Unit-Request), WB-GO (Write Buffer-GO), ST1-REQ (Store 1-Request) and ST2-REQ (Store 2-Request).

Figure 4:
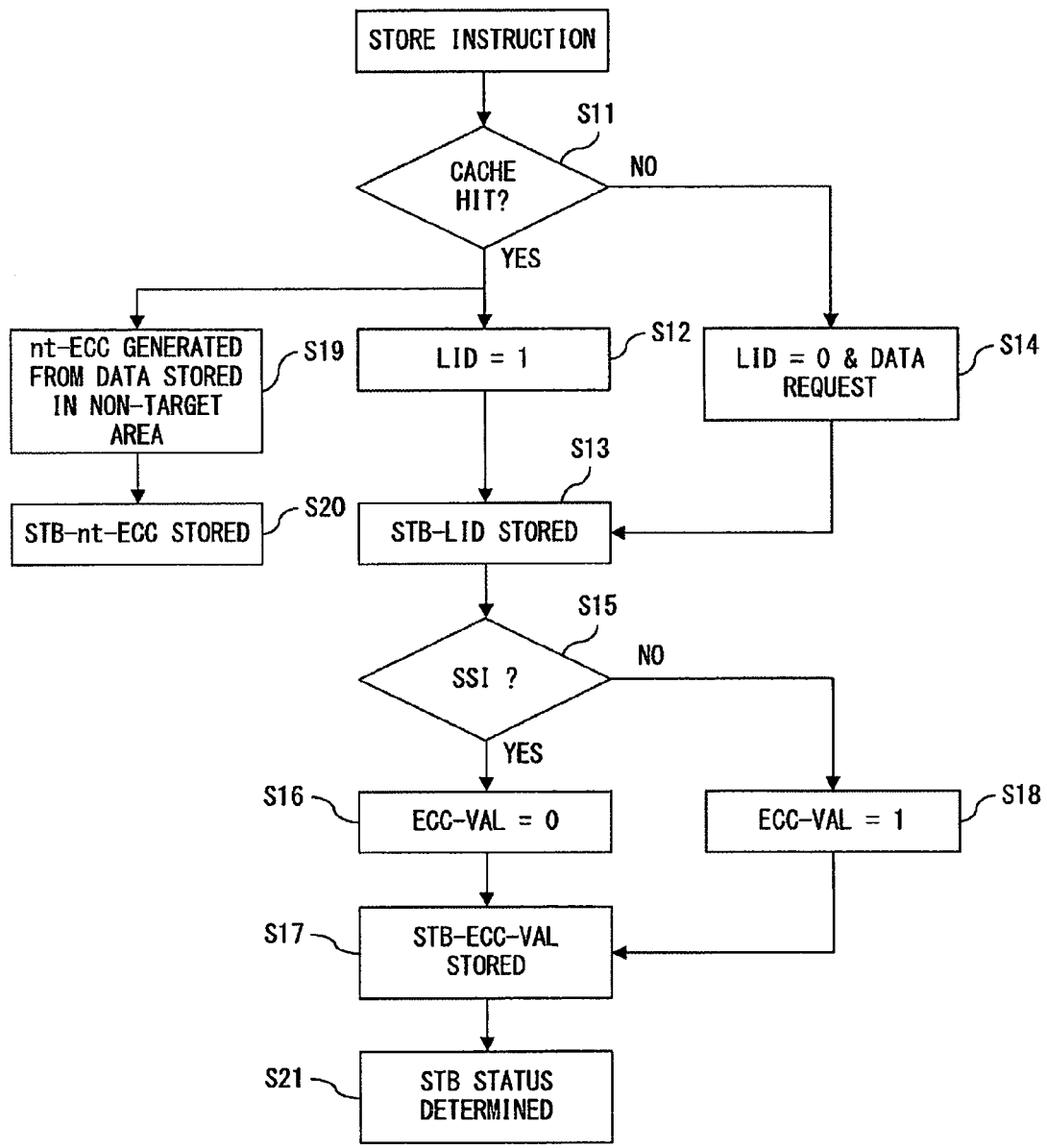
FIG. 4 is a flowchart of an operation during IU-REQ.

First, the operation of the store processing unit 24 during IU-REQ is described, referring to the operation flowchart in FIG. 4.

The processing operation during IU-REQ refers to the operation through which the store processing unit 24 receives a store instruction from the instruction processing unit 22, generates an nt-ECC, an LID, ECC validity information and the like, and stores them in the store buffer 25.

The store processing operation unit 24 receives a store instruction from the instruction processing apparatus 22, and judges whether or not the data to be stored exists in the data RAM 27, i.e. it judges a presence or absence of a cache hit (FIG. 4, S11).

When there has been a cache hit (S11, YES), a store byte mark STBM is generated from store information in the store instruction, the LID showing the presence or absence of the cache hit is set to "1" (S12), and these data are stored in the store buffer 25 (S13).

When there has been no cache hit (S11, NO), the process proceeds to step S14 where the LID is set to "0", and the process then proceeds to step S13 described above where "LID=0" is stored in the store buffer 25. In this case, since there has been a cache miss, an instruction is issued to the CPU for reading out, from the main memory, data specified in the store instruction.

Next, a judgment as to whether or not the store data in the store instruction is the object of Store-Store-Interlock is performed (S15).

In the process in step S15 mentioned above, the store address in a preceding store address and the store address in the current store instruction are compared to judge whether the addresses are the same or not. When the addresses are the same, i.e. the same store address exists in a plurality of buffers, i.e. the store buffers 25 and the write buffers 26, a judgment as to whether or not the data width of the store data in the current store instruction corresponds to a predetermined data width (in the embodiment, 8 bytes) is performed. The judgment as to whether or not the data width of the store data corresponds to the predetermined data is performed by using, for example, the value of the store byte mark STBM. When the data width of the store data is smaller than the predetermined data width, the store instruction is determined as the object of Store-Store-Interlock. In the other cases, it is excluded from the object of the Store-Store-Interlock.

When the store instruction is determined as the object of Store-Store-Interlock (S15, YES), the process proceeds to step 16 where the ECC validity information ECC-VAL is set as invalid by assigning "0", and in the next step 17, the set ECC validity information ECC-VAL is stored in the store buffer 25.

When the store data has not been determined as the object of Store-Store Interlock (S15, NO), the step proceeds to step S18 where the ECC validity information ECC-VAL is set to "1". The process then proceeds to step S17 described above where the set ECC validity information ECC-VAL is stored in the store buffer 25.

When there has been a cache hit according to the judgment performed in step S1, an error-correcting code nt-ECC is generated in step S19 from the data stored in the non-target area that was read out with the search of the cache. The generated nt-ECC is stored in the store buffer 25 (S20).

The status of the store buffer 25 is determined as described above, by associating the nt-ECC, LID, ECC validity information ECC-VAL with the stored data, and storing them in the store buffer 25 (S21).

Figure 5:
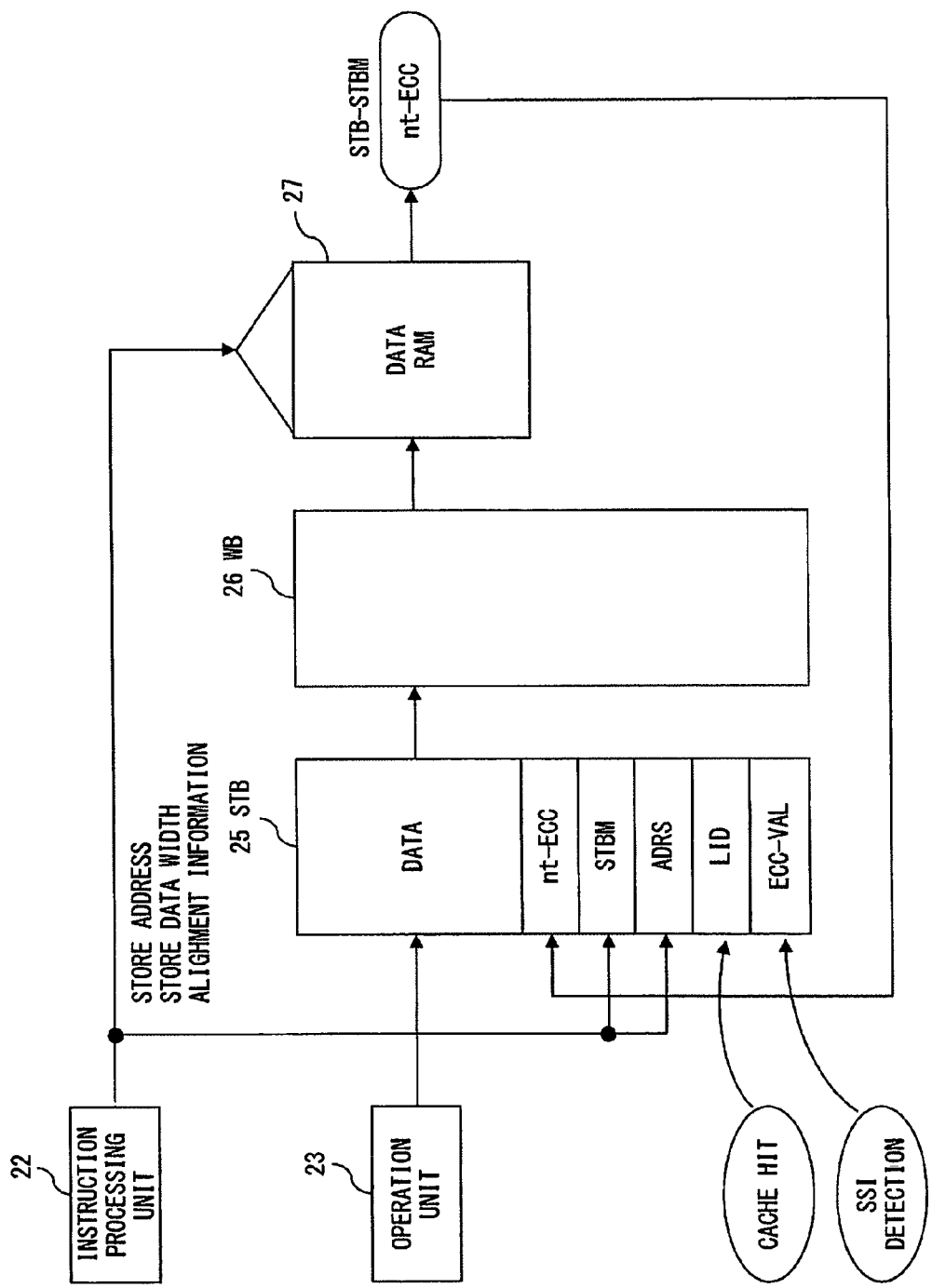
FIG. 5 is a diagram describing the operation during IU-REQ.

Next, the operation during IU-REQ described above is explained below, referring to FIG. 5 describing the operation and the time chart in FIG. 6.

The store processing operation unit 24 receives a store instruction from the instruction processing apparatus 22, and judges whether or not the data to be stored exists in the data RAM 27. When the data to be store exists in the data RAM 27, i.e. when there has been a cache hit, a judgment as to whether or not the store address in a preceding store instruction and the store address in the current store instruction correspond, and a judgment as to whether or not the data width of the store data corresponds to a predetermined data width (for example, 8 bytes) are performed (FIG. 6, (1)).

Figure 6:
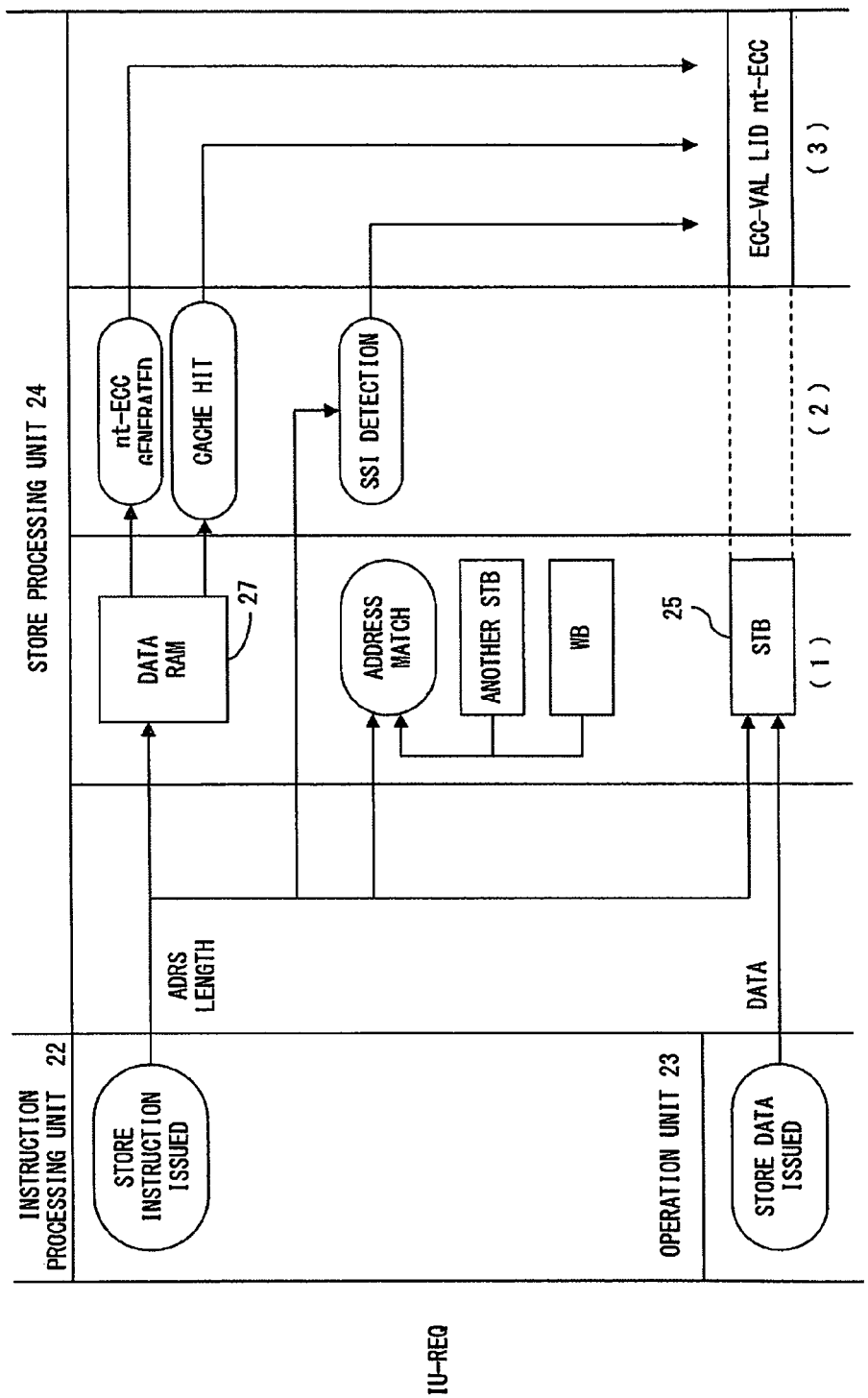
FIG. 6 is a time chart showing the operation during IU-REQ.

When the same store address exists in different store buffer 25 and write buffer 26, and the data width of the store data in the current store instruction is smaller than the predetermined data width (for example, when the full length of 8 bytes is not to be stored), the store instruction is determined as the object of Store-Store-Interlock (FIG. 6, (2), SSI DETECTION).

When there has been a cache hit and Store-Store-Interlock is not to be applied, an error correcting code nt-ECC is generated from the data stored in the non-target area (data not being specified by the store byte mark) that was read out from the store address in the data RAM 27 with the search of the cache, an ECC validity information ECC-VAL is set to "1", and the store byte mark STBM, nt-ECC, LID and ECC validity information are associated with store data and stored in the store buffer 25 (FIG. 6, (3)).

When there has been a cache miss, or when the store instruction is the object of Store-Store-Interlock, the LID is set to "0", or the ECC validity information is set to "0", and these data are stored in the store buffer 25 (FIG. 6, (3)).

Figure 7:
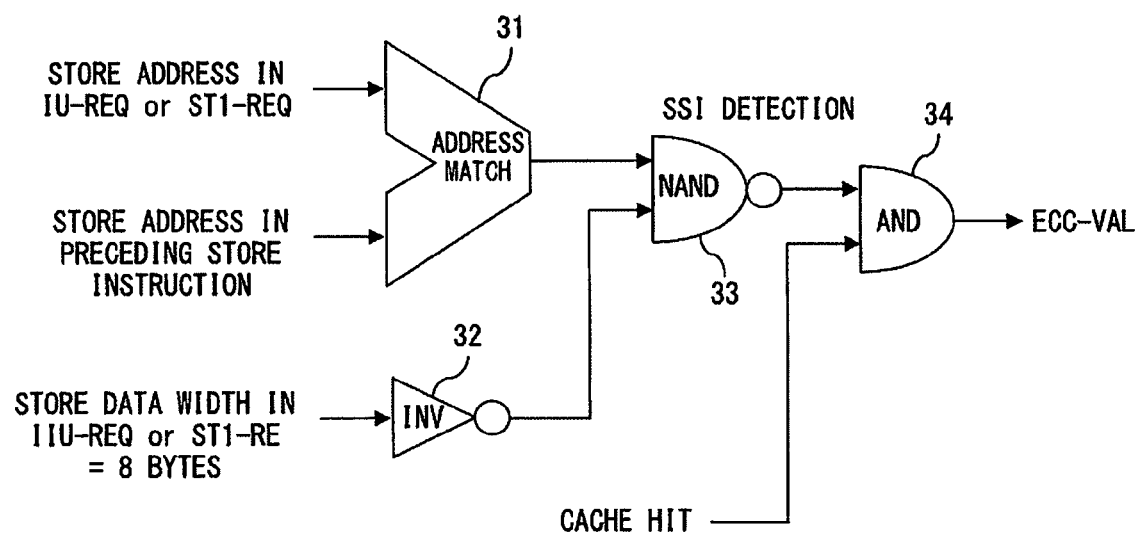
FIG. 7 is a block diagram of a circuit for setting ECC-VAL.

FIG. 7 is a block diagram of a circuit for setting ECC validity information ECC-VAL.

An address matching circuit 31 judges whether the store address in IU-REQ or ST1-REQ and the store address in a preceding store instruction correspond. The address matching circuit 31 outputs "1" when the store address in IU-REQ or ST1-REQ corresponds to the store address in the preceding store instruction, and outputs "0" when they do not correspond.

An inverter 32 outputs an inversion signal showing whether or not the data width of the store data in IU-REQ or ST1-REQ is 8 bytes. The inverter 32 outputs "0" when the data width in IU-REQ or ST1-REQ is 8 bytes, and outputs "1" when the data width is smaller than 8 bytes.

A NAND gate 33 outputs a signal showing whether of not Store-Store-Interlock is to be applied (the signal is referred to as an SSI detection signal hereinafter), on the basis of the result of the comparison of the store addresses in the address matching circuit 31, and the signal output from the inverter 32 showing whether or not the data width of the store data is 8 bytes.

Specifically, when the store address in IU-REQ or ST1-REQ matches the store address in the preceding store instruction and the data width of the store data in IU-REQ or ST1-REQ is smaller than 8 bytes, the SST detection signal is set to "0" to show that Store-Store-Interlock is to be applied. Meanwhile, when the store address in IU-REQ or ST1-REQ and the store address in the preceding store instruction do not match, or the data width of the store data in IU-REQ or ST1-REQ is 8 bytes, the SSI detection signal is set to "1".

An AND gate 34 sets ECC validity information ECC-VAL to "0", when the SSI detection signal is "0"/, i.e., when the store data is the object of Store-Store-Interlock. When the SSI detection signal is "1", i.e. when Store-Store-Interlock is not to be applied, the ECC validity information ECC-VAL is set to "1" to show that the nt-ECC is provided appropriately.

Figure 8:
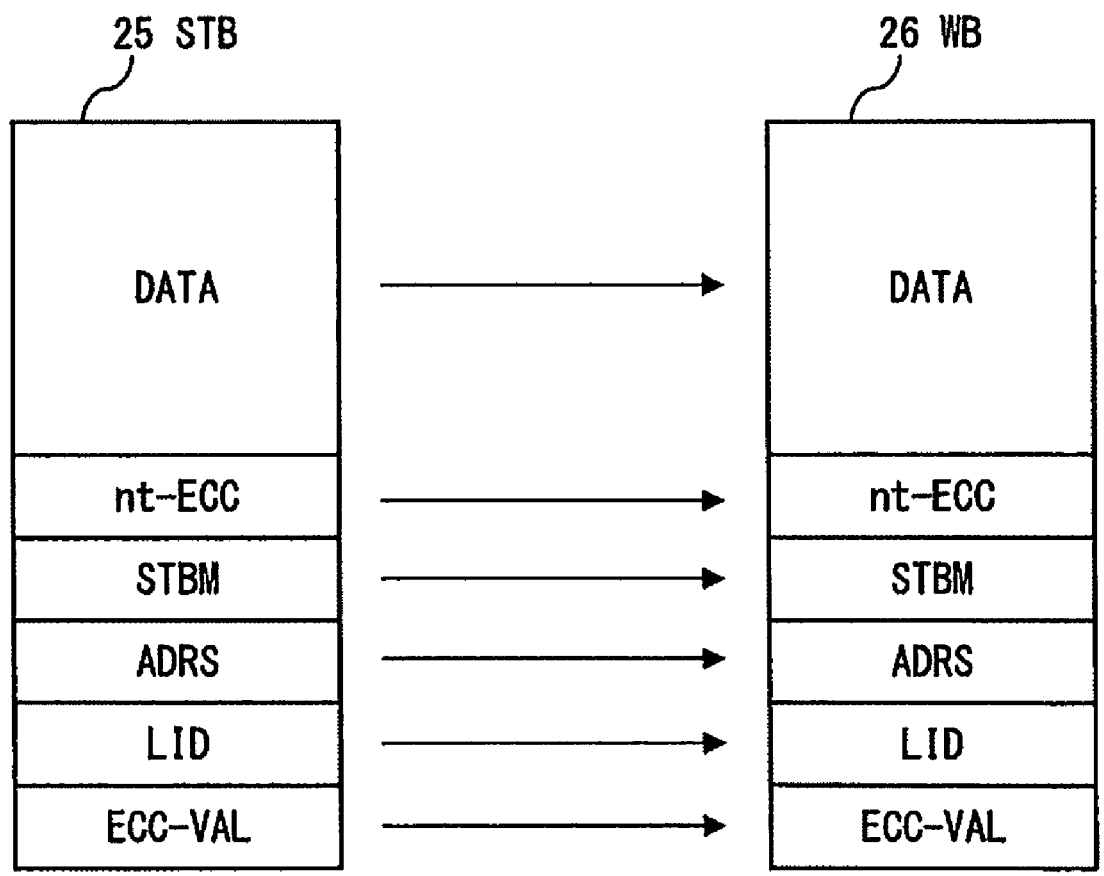
FIG. 8 is a diagram describing an operation during WB-GO.

Next, the operation of the store processing unit 24 during WB-GO is explained below, referring to FIG. 8 describing the operation. WB-GO refers to the operation through which the data in the store buffer 25 is written into the write buffer 26.

The store processing unit 24 receives a store instruction from the instruction processing unit 22 and judges whether or not the priority of the process for the store buffer 25 to be processed is the highest, and whether or not any write buffer 26 is available. When the priority is highest and there is an available write buffer 26, the data to be stored, nt-ECC, store byte mark STEM, store address ADRS, LID and ECC validity information in the store buffer 25 are written into write buffer 26.

Next, the operation during ST1-REQ is explained below, referring to the operation flowchart in FIG. 9. ST1-REQ refers to the processing operation in the case where there has been a cache miss with the LID being "0", or in the case where the nt-ECC is not determined with ECC validity information ECC-VAL being "0".

Figure 9:
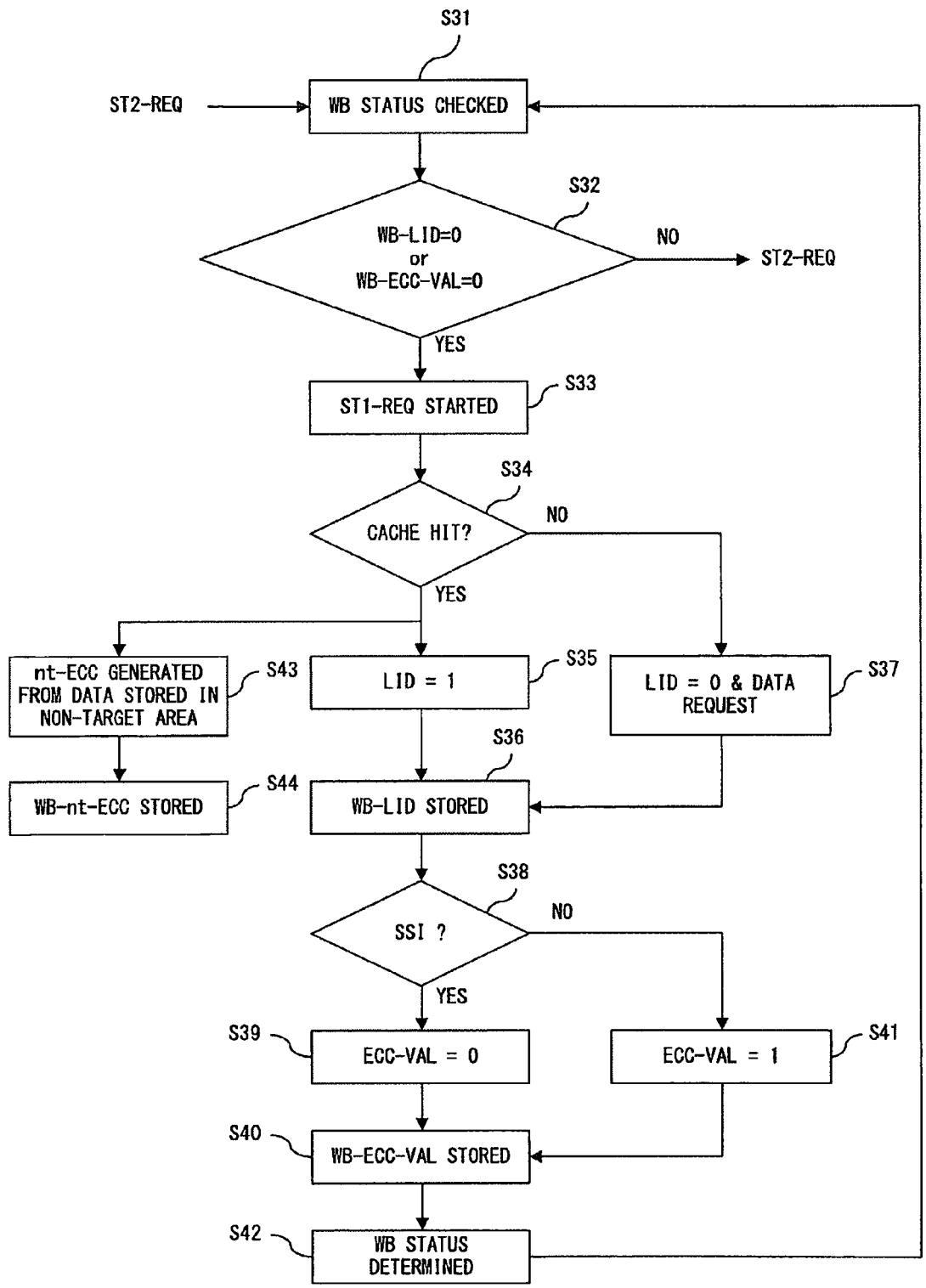
FIG. 9 is a flowchart of an operation during ST1-REQ.

Data in a specified store address in a write buffer 26 is read out and the status of the write buffer 26 is checked (FIG. 9, S31).

Next, a judgment as to whether or not the LID read out from the write buffer 26 is "0", and a judgment as to whether or not the ECC validity information ECC-VAL is "0" are performed (S32).

When there has been a cache miss with the LID being "0", or when the ECC validity information ECC-VAL is "0" (S32, YES), the process proceeds to step S33, staring up ST1-REQ.

When the ST1-REQ starts, the judgment of the presence or absence of a cache hit is performed in step S34. When there has been a cache hit (S34, YES), the process proceeds to step S35 where the LID is set to "1". Next, the LID set to "1" is stored in the write buffer 26 (S36). When there has been a cache miss according to the judgment performed in step S34 (S34, NO), the process proceeds to step S37 where the LID is set to "0". The process then proceeds to step S36 described above where LID=0 is stored in the write buffer 26. In this case, since there has been a cache miss, an instruction is issued to the instruction processing unit 22, for reading out the data from the main memory.

Next, the judgment as to whether or not the store instruction is the object of Store-Store-Interlock SSI is performed (S38). The judgment as to whether or not Store-Store-Interlock is to be applied is performed on the basis of whether or not the same store address exists in a plurality of write buffers 26, and whether or not the data width of the store data in the following store instruction is smaller than a predetermined data width.

When the store instruction is the object of Store-Store-Interlock (S38, YES), the process proceeds to step S39 where the ECC validity information ECC-VAL is set to "0". The set ECC validity information ECC-VAL is stored in the write buffer 26 (S39).

When the store instruction is not the object of the Store-Store-Interlock according to the judgment performed in step S38 (S38, NO), the process proceeds to step S41 where the ECC validity information ECC-VAL is set to "1".

Meanwhile, when a preceding store instruction for writing the data into the same store address exists and its following store instruction is the object of Store-Store-Interlock, the following store instruction is no longer the object of Store-Store-Interlock when the preceding store instruction is completed. In this case, the ECC validity information ECC-VAL is changed to "1" in step S41 described above. When the ECC validity information ECC-VAL is changed, a new nt-ECC is generated on the basis of the data stored in the non-target area in the data RAM 27 after the change, and the generated nt-ECC is stored in the write buffer 26, in steps S43 and S44 described later.

The status of the write buffer 26 is determined as described above by, for example, setting the LID and ECC validity information ECC-VAL, and the like (S42).

When there has been a cache hit according to the judgment performed in step S34, an nt-ECC is generated from the data stored in the non-target area that was read out from the store address in the data RAM 27 with the search of the cache in step S43. The generated nt-ECC is stored in the write buffer 26 (S44).

Figure 10:
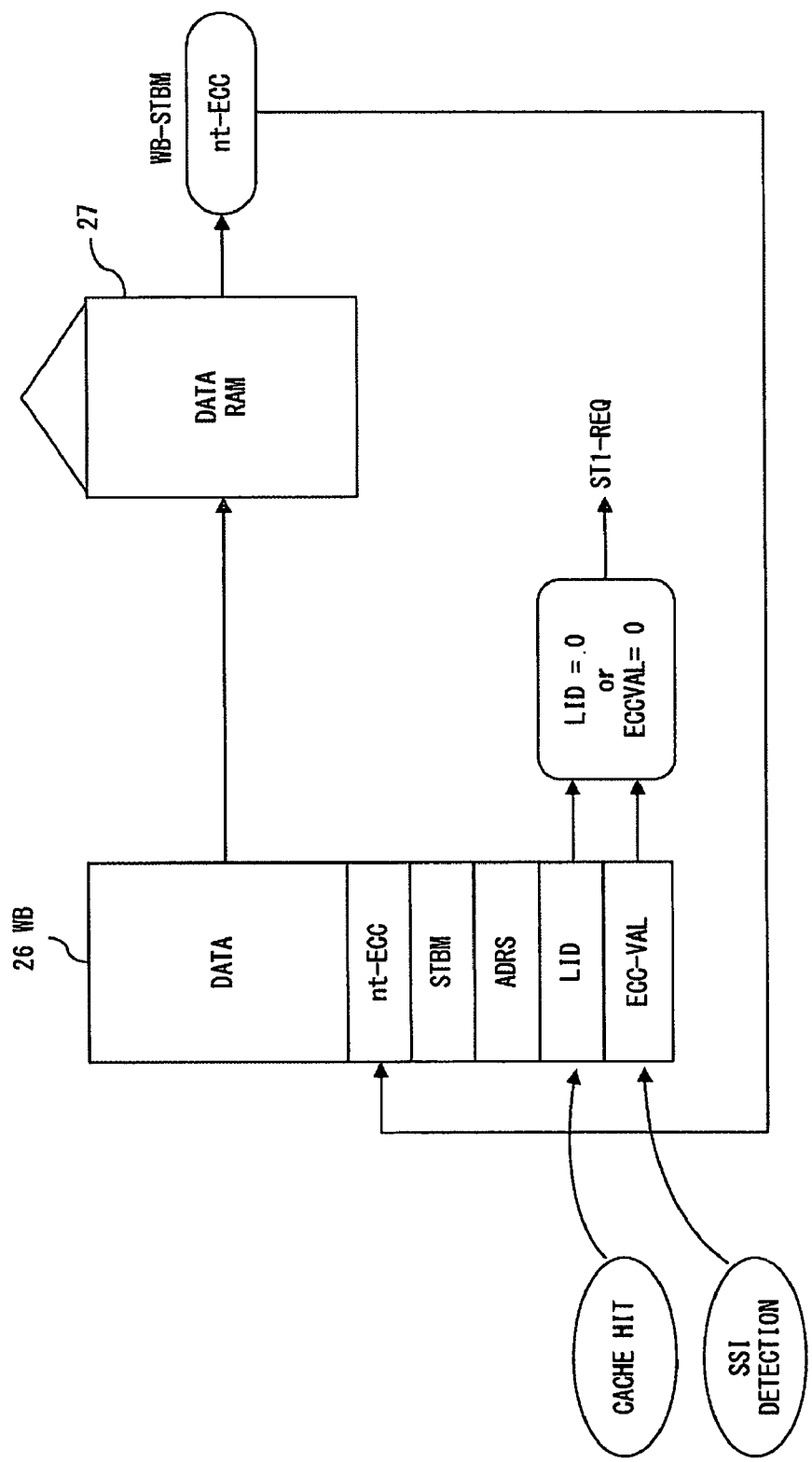
FIG. 10 is a diagram describing the operation during ST1-REQ.
Figure 11:
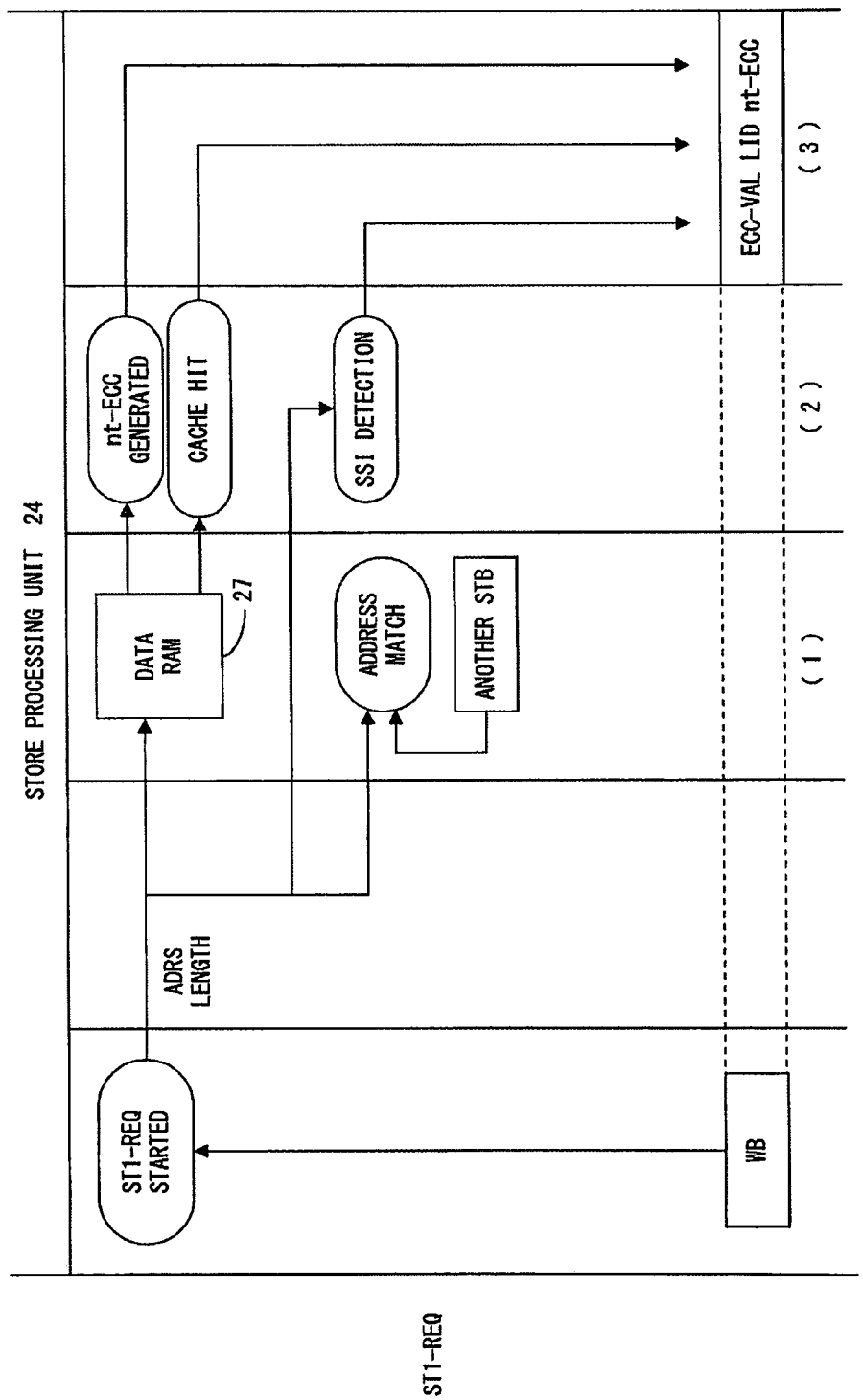
FIG. 11 is a time chart showing the operation during ST1-REQ.

Next, the operation of the store processing unit 24 during ST1-REQ is explained, referring to FIG. 10 describing the operation and the time chart in FIG. 11.

As shown in FIG. 10, the store processing unit 24 reads out the LID and ECC validity information ECC-VAL in a store address in the write buffer 26. In the case where LID=0 or ECC-VAL=0, the ST1-REQ operation is performed.

When there has been a cache hit, a judgment as to whether or not the same store address as the store address in the current store instruction exists in another write buffer 26 is performed (FIG. 11, (1)).

When the same store address as the store address in the current store instruction exists in another write buffer 26, a judgment as to whether or not the data width of the store data corresponds to the predetermined data width is performed. When the data width of the store data is smaller than the predetermined data width, it is determined as the object of Store-Store-Interlock (FIG. 11 (2)).

When the store instruction is determined as the object of Store-Store-Interlock, ECC validity information ECC-VAL "0" is written into the corresponding store address in the write buffer 26, and an nt-ECC generated from the data stored in the non-target area in the corresponding store address in the data RAM 27 is written into the corresponding store address in the write buffer 26 (FIG. 11, (3)).

Next, the operation of the store processing unit 24 during ST2-REQ is explained below, referring to the operation flowchart in FIG. 12.

Figure 12:
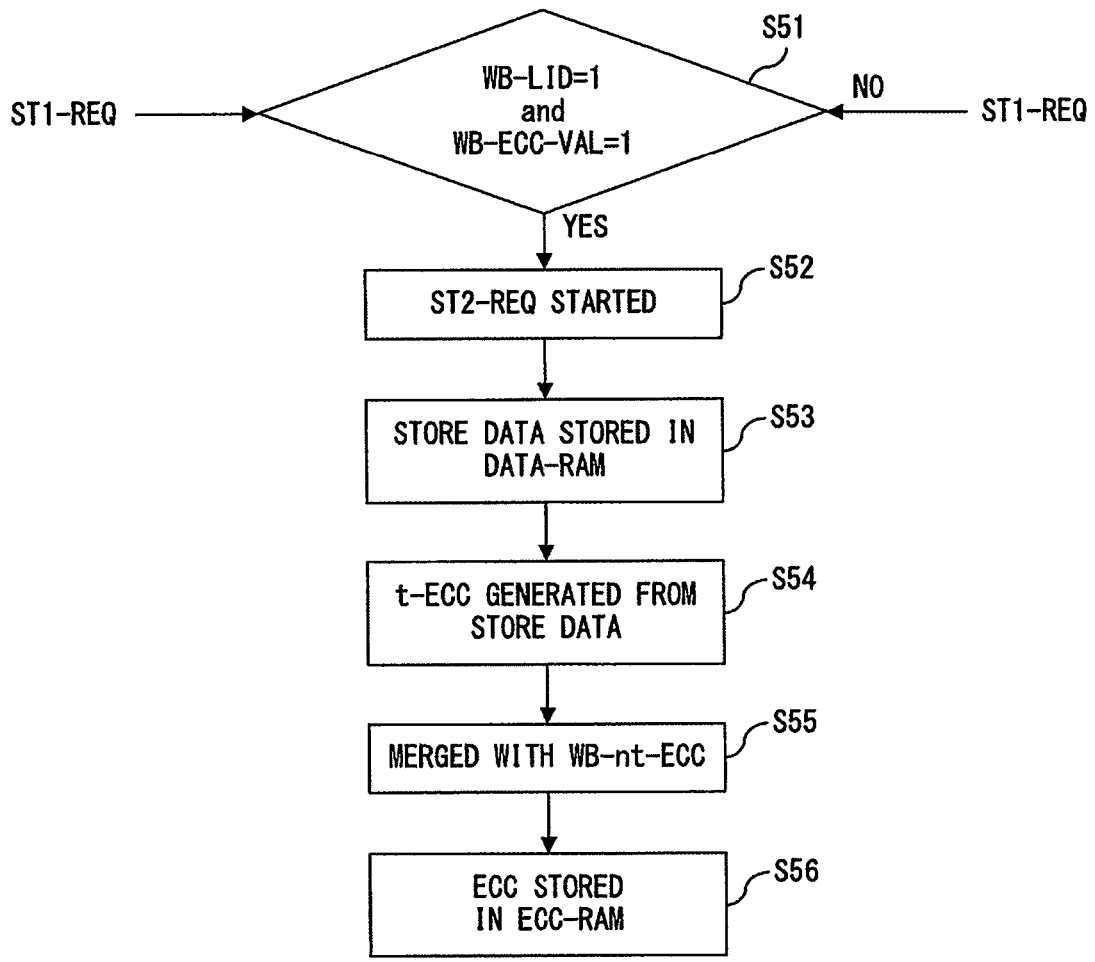
FIG. 12 is a flowchart of an operation during ST2-REQ.

First, a judgment as to whether LID=1 and ECC-VAL=1 are set in the write buffer 26 is performed (FIG. 12, S51).

In the case where LID=1 and ECC-VAL=1 (S51, YES), i.e. the data to be stored exists in the data RAM 27 (cache memory) and the store instruction is not the object of Store-Store-Interlock, the process proceeds to step S52, starting up ST2-REQ.

When ST2-REQ starts, the store data in the write buffer 26 is stored in the data RAM 27. Next, a t-ECC is generated on the basis of the store data in the write buffer 26 (S54).

The generated t-ECC and the nt-ECC stored in the corresponding address in the write buffer 26 are then merged (S55).

Finally, the error correcting code ECC obtained by the merger is stored in an ECCRAM 28 (S56).

Next, the operation during ST2-REQ is explained below, referring to FIG. 13 describing the operation, the time chart in FIG. 14 and the block diagram of an ECC generation circuit in FIG. 15.

Figure 13:
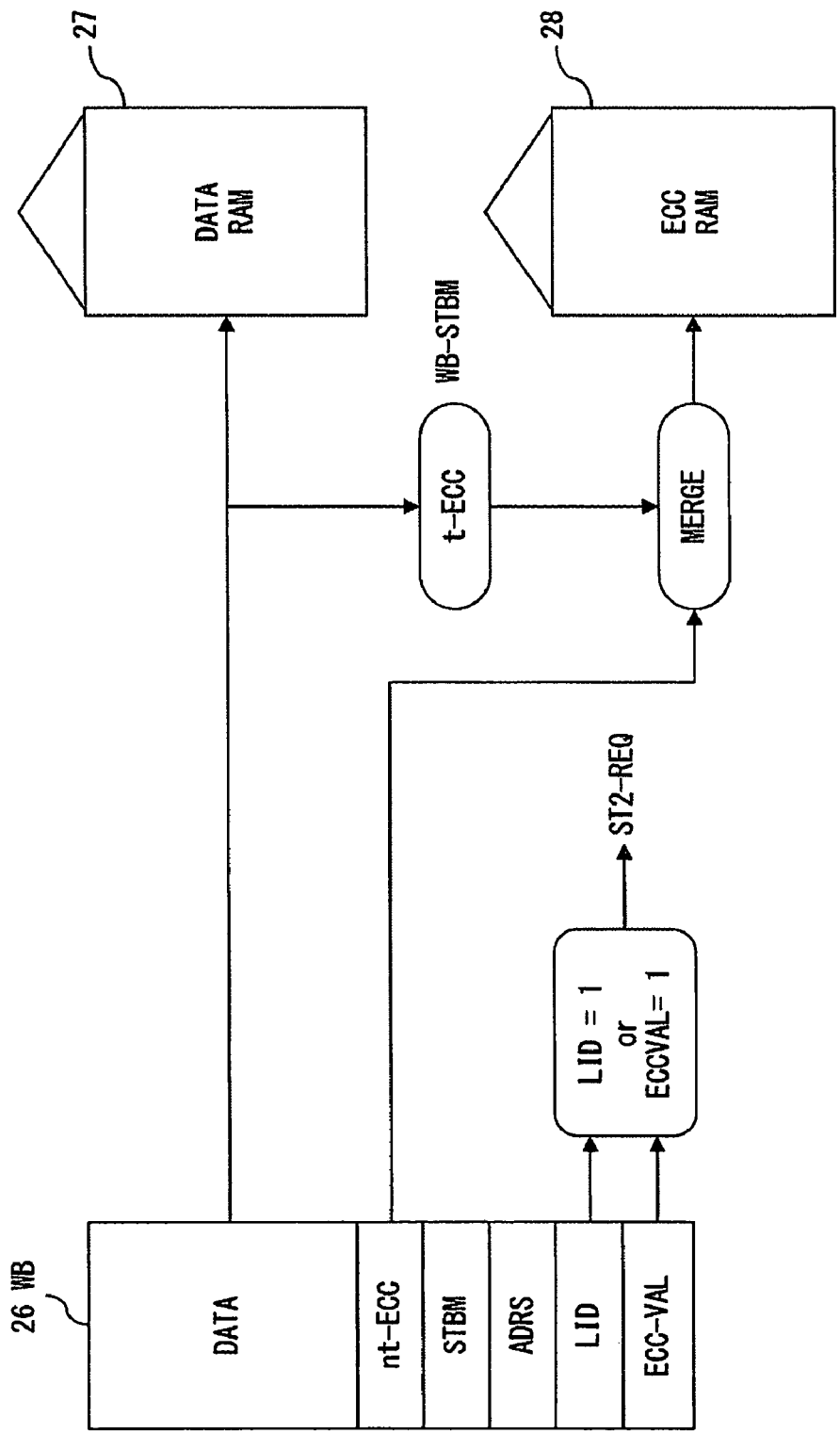
FIG. 13 is a diagram describing the operation during ST2-REQ.
Figure 14:
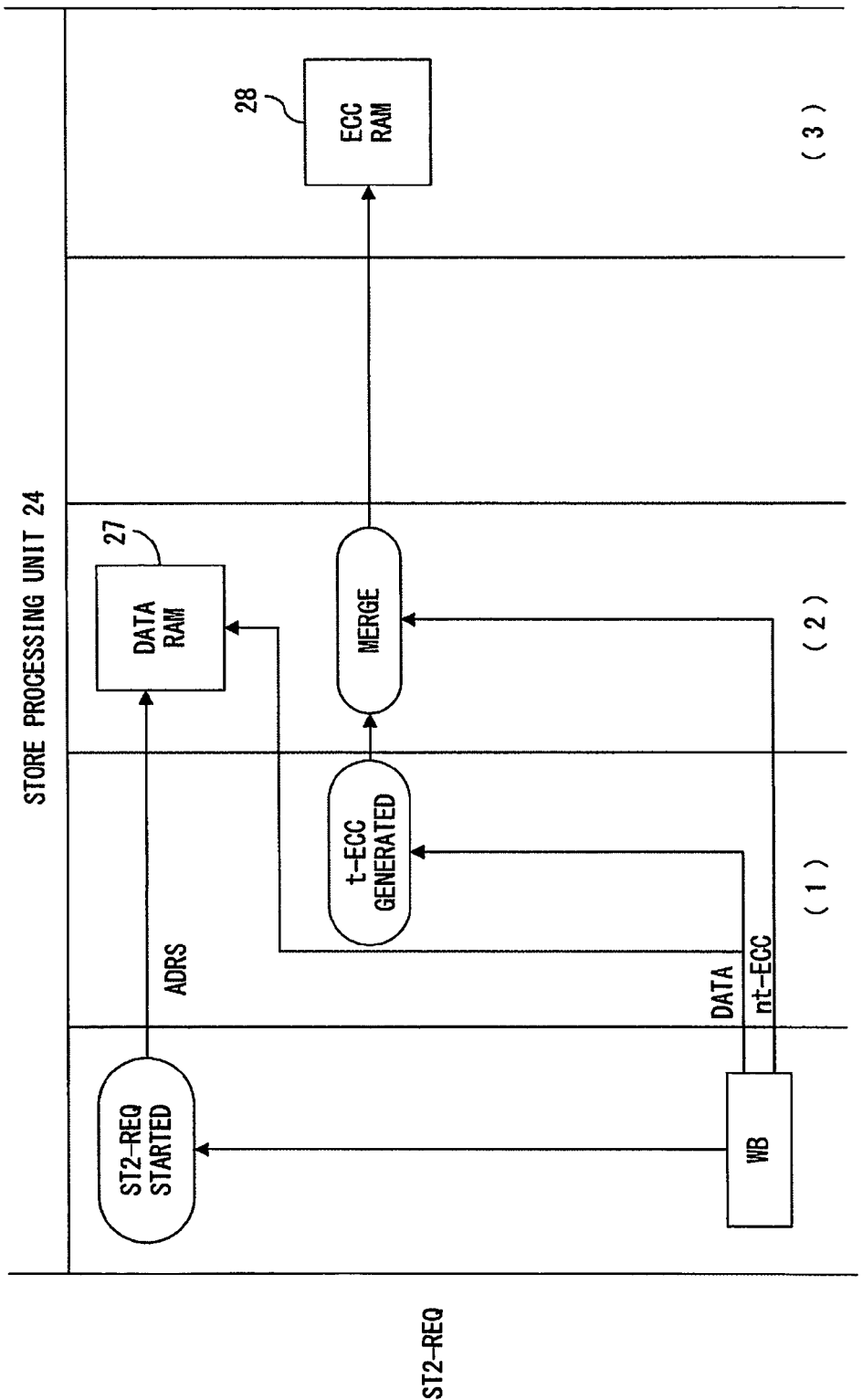
FIG. 14 is a flowchart showing the operation during ST2-REQ.

As shown in FIG. 13 and FIG. 14, the store processing unit 24 reads out LID and ECC validity information ECC-VAL in a specified store address in the write buffer 26, judges whether or not the LID=1 and the ECC=1 are set. When both are judged as "1", ST2-REQ operation is performed.

First, at ECC for the store data is generated on the basis of the data in the corresponding store address in the write buffer 26 (FIG. 14, (1)).

Next, the error correcting code nt-ECC for the data stored in the non-target area is read out from the corresponding store address in the write buffer 26, and the nt-ECC and the error correcting code t-ECC generated from the store data in the target area are merged (FIG. 14 (2)). At the same time, the store data in the write buffer 26 is written into the data RAM 27.

Next, the resultant data of the merger of the t-ECC and the nt-ECC is stored in the ECCRAM 28 (FIG. 14, (3)).

Figure 15:
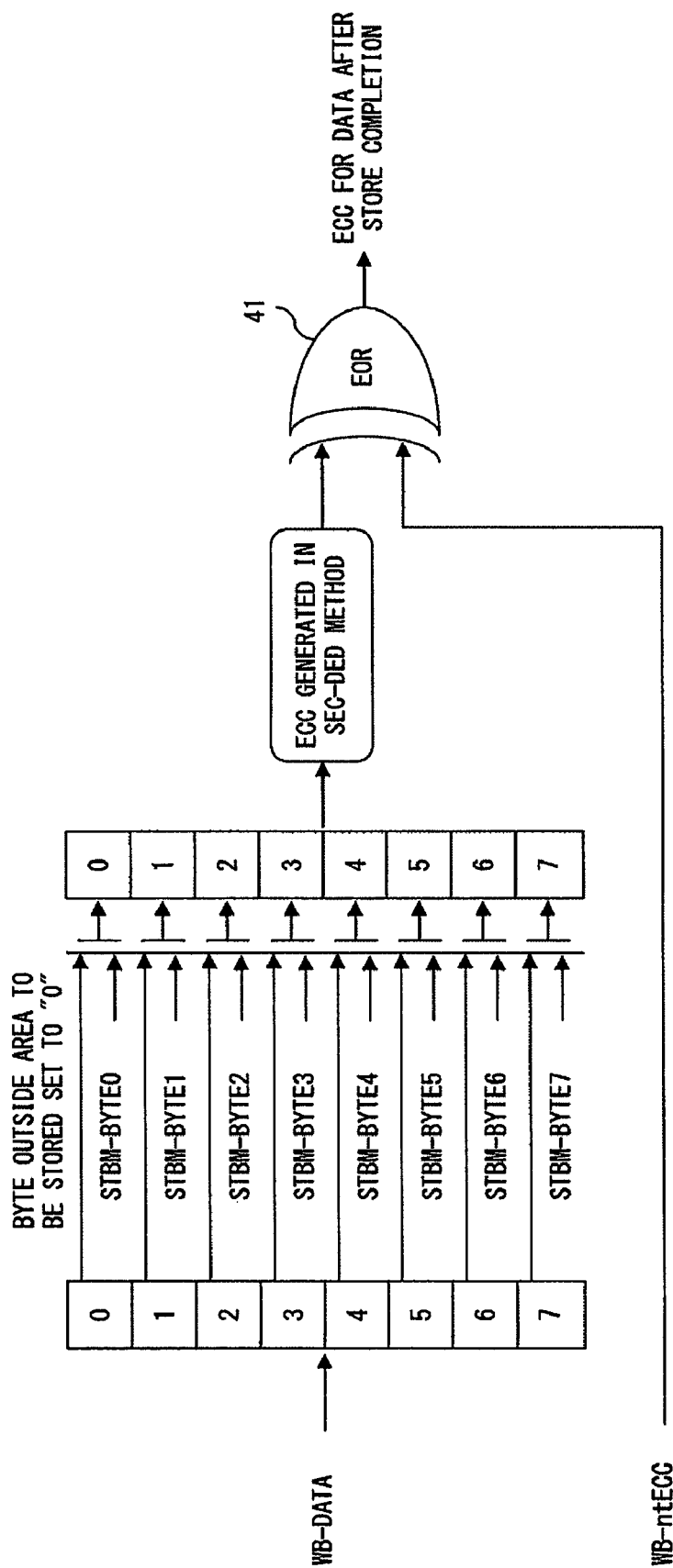
FIG. 15 is a block diagram of an ECC generation circuit.
Figure 16:
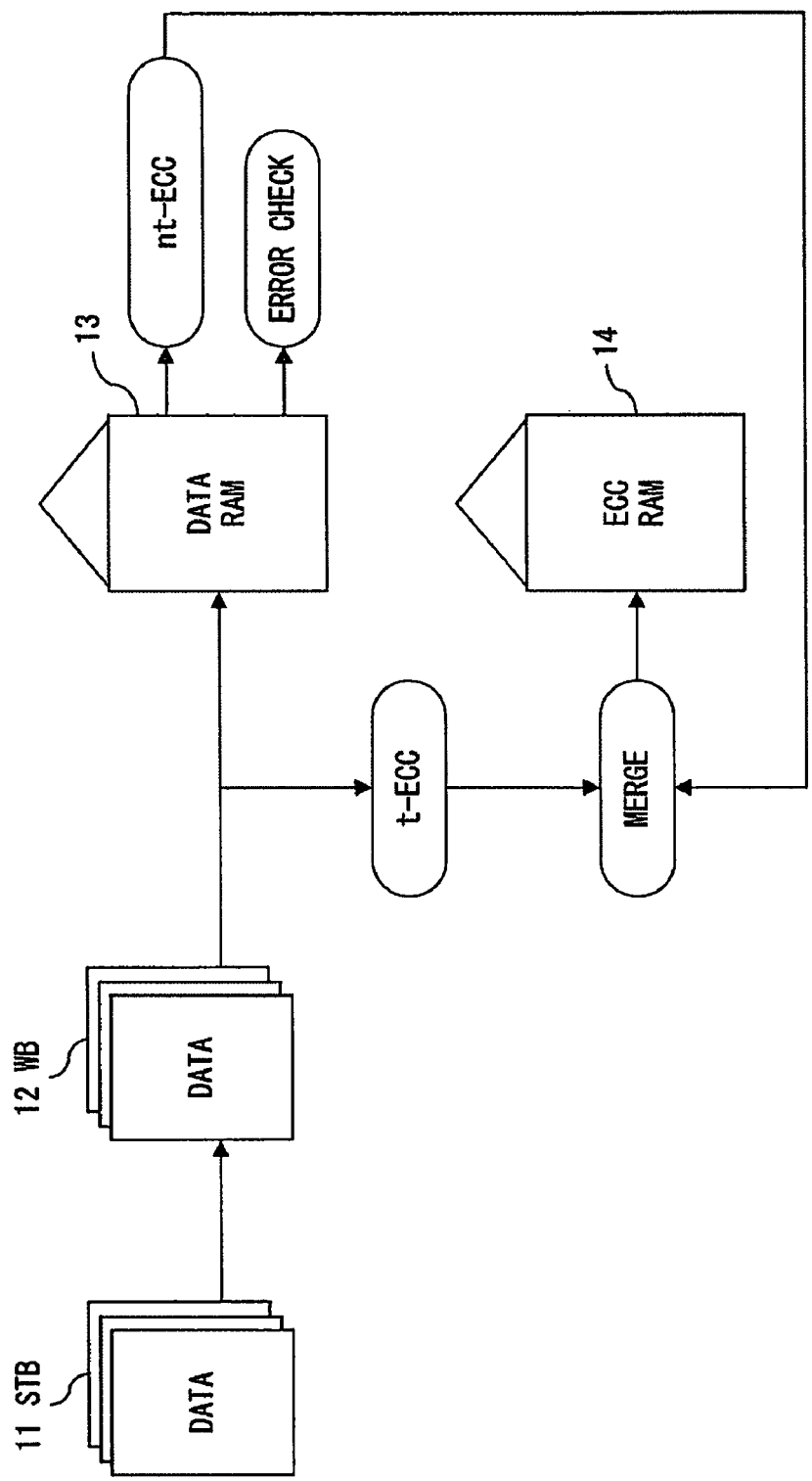
FIG. 16 is a diagram describing a conventional an error correcting code generation method.

FIG. 15 is a block diagram of the ECC generation circuit. In FIG. 15, the logical AND of 8-byte data in the write buffer 26 and the value of the store byte mark STBM of each byte is calculated, and the byte data in the non-target area is set to "0". An error correcting code t-ECC is then generated for the data stored in the target area in the SEC-DED (Single bit Error Correcting-Double bit Error Detecting) method, and is output to an exclusive OR circuit EX-OR 41. An nt-ECC (generated in the SEC-DED method) stored in the write buffer 26 is input to the other input end of the exclusive OR circuit EX-OR 41. The exclusive OR circuit EX-OR 41 calculates the exclusive OR of the input data, and the result is output to the ECCRAM 28 as the ECC of the data for which the store operation is completed.

The ECC generation circuit described above merges the error correcting code t-ECC for the store data stored in the write buffer 26 and the error correcting code nt-ECC generated from the data stored in the non-target area in the corresponding store address that was read out with the search of the data RAM 27, and the resultant of the merger is written into the ECCRAM 28 as the error correcting code ECC.

In the embodiment described above, an error correcting code nt-ECC is generated on the basis of the data stored in the non-target area that was readout from the data RAM (cache memory) 27 with the search of the cache memory, and then the generated nt-ECC is associated with the store data and stored in the store buffer 25. The store data in the store buffer 25 and the nt-ECC are further written into the write buffer 26, and an error correcting code t-ECC is generated on the basis of the data stored in the target area in the write buffer 26. The nt-ECC and t-ECC are then merged and the resultant of the merger is written into the ECCRAM 28 as the error correcting code for the store data.

The configuration described above makes it possible to correct a 1 bit error of the data appropriately, even when an error is detected by an error check performed after the store data is written into the data RAM (cache memory) 27, by using the error correcting code obtained by merging the nt-ECC generated from the data stored in the non-target area that was read out from the data RAM 27 with the search of the cache memory and the t-ECC generated from the store data to be written into the data RAM 27.

Meanwhile, when the store address in the preceding store instruction is the same as the store address in the current store instruction and the data width in the current store instruction is smaller than the predetermined data width (for example, 8 bits), ECC validity information ECC-VAL is set as invalid (for example, "0"), and the set ECC validity information ECC-VAL is associated with the store data and stored in the store buffer 25. When the store addresses do not correspond or the data width corresponds to the predetermined data width, the ECC validity information ECC-VAL is set as valid (for example, "1"), associated with the store data and nt-ECC, and stored in the store buffer 25.

The configuration described above makes it possible, even when there exists the preceding store instruction having the same address exists and the data width in the current store instruction is smaller than the predetermined data width, making the current store instruction to be suspended, the suspended status with Store-Store-Interlock control can be cancelled by changing the ECC validity information for the current store instruction from invalid ("0") to valid ("1"). Therefore, the occurrence of unnecessary waiting time before performing the current store instruction with Store-Store-Interlock control can be avoided.

According to the present invention, an error of data can be corrected appropriately, even when the error is detected after the data is written into the cache memory, by using the error correcting code generated from the first error correcting code generated from the data stored in the non-target area before the writing of the data and the second error correcting code generated from the data stored in the target area in the cache memory.

The present invention is not limited to the embodiment described above, and can be configured as described below.

(1) The present invention can be applied to a CPU and the like having a cache memory and to an information processing apparatus equipped with the CPU. In addition, it can be applied not only to the error correcting code in the SEC-DED method, but also to error correcting codes in other methods. While the embodiment only describes the case involving a plurality of store buffers 2 and write buffers 26, i.e. two types of buffers, the present invention can be applied to the case involving the store buffer 25 only, or the write buffer 26 only (2) While the embodiment describes the operation of the store processing unit 24 in four parts, i.e. IU-REQ, WB-GO, ST1-REQ and ST2-REQ, the operation is not limited to the four types.

(3) While the error correcting code nt-ECC generated from the data stored in the non-target area in the data RAM 27 is stored in the store buffer 25 and the write buffer 26, it can be stored in a register other than the store buffer 25 and the write buffer 26.

What is claimed is:

1. An error correcting code generation method, comprising:

storing data to be stored in a store instruction in a buffer;

searching a cache memory to perform a judgment as to whether the data to be stored exists in the cache memory;

when the data to be stored exists in the cache memory according to the judgment, generating a first error correcting code on the basis of data other than the data to be stored that was read out from the cache memory with the search of the cache memory, and keeping the generated first error correcting code;

generating a second error correcting code on the basis of the data to be stored in the buffer; and generating an error correcting code for the data by merging the first error correcting code and the second error correcting code, wherein a judgment as to whether a store address in a preceding store instruction corresponds to a store address in a current store instruction, and a judgment as to whether a data width of the data to be stored in the current store instruction corresponds to a predetermined data width are performed, and when the preceding store instruction having a same store address exists and the data width of the data in the current store instruction is smaller than the predetermined data width, ECC validity information showing whether the first error correcting code is appropriate is set as invalid, and the ECC validity information is associated and stored with the data and the first error correcting code.

2. The error correcting code generation method according to claim 1, wherein the buffer comprises a plurality of buffers and a judgment as to whether a same address exists in the plurality of buffers and a judgment as to whether a data width of the data in the current store instruction corresponds to the predetermined data width are performed, and when the same store address exists in the plurality of the buffers and the data width of the data in the current store instruction is smaller than the predetermined data width, the ECC validity information is set as invalid, and the ECC validity information is associated with the data and the first error correcting code, and stored in the corresponding store address in the buffer.

3. The error correcting code generation method according to claim 1, wherein a judgment as to whether the ECC validity information is set as valid or invalid is performed, and when the ECC validity information is set as valid, the first error correcting code and the second error correcting code are merged to generate an error correcting code for the data.

4. The error correcting code generation method according to claim 1, wherein when the preceding store instruction is completed while the ECC validity information in the buffer is set as invalid, the ECC validity information in a corresponding store address in the buffer is changed and to valid.

5. A memory control apparatus comprising:

a buffer that stores data specified by a store instruction;

a judgment circuit that searches a cache memory to judge whether the data to be stored in the store instruction exists in the cache memory;

a first error correcting code generation circuit that generates, when the data to be stored exists in the cache memory according to the judgment performed by the judgment circuit, a first error correcting code on the basis of data other than the data to be stored that was read out from the cache memory with the search of the cache memory and keeping the generated first error correcting code;

a second error correcting code generation circuit that generates a second error correcting code on the basis of the data to be stored in the buffer; and a merge circuit that generates an error correcting code for the data by merging the first error correcting code and the second error correcting code, wherein the first error correcting code generation circuit performs a judgment as to whether a store address in a preceding store instruction corresponds to a store address in a current store instruction and a judgment as to whether a data width of the data in the current store instruction corresponds to a predetermined data width, and when a preceding store instruction having a same store address and the data width of the data in the current store instruction is smaller than the predetermined data width, ECC validity information showing whether the first error correcting code is appropriate is set as invalid, and the ECC validity information is associated and stored with the data and the first error correcting code.

6. The memory control apparatus according to claim 5, wherein
the buffer comprises a plurality of buffers; and
the first error correcting code generation circuit performs a judgment as to whether the same store address exists in the plurality of the buffers and a judgment as to whether a data width of the data in the current store instruction correspond to the predetermined data width, and when the same store address exists in the plurality of the buffers and the data width of the data in the current store instruction is smaller than the predetermined data width, the ECC validity information is set as invalid, and the ECC validity information is associated with the data and the first error correcting code, and stored in the store address in the buffer.

7. The memory control apparatus according to claim 5, wherein
the merge circuit performs a judgment as to whether the ECC validity information is set as valid or invalid, and when the ECC validity information is set as valid, the first error correcting code and the second error correcting code are merged to generate an error correcting code for the data.

8. The memory control apparatus according to claim 5, wherein
when the preceding store instruction is completed while the ECC validity information in the buffer is set as invalid, the ECC validity information in a corresponding store address in the buffer is changed to valid.

9. A non-transitory computer-readable storage medium on which is recorded a program for causing a computer to execute a process generating an error correcting code, said process comprising:
storing data to be stored in a store instruction in a buffer;
searching a cache memory to perform a judgment as to whether the data to be stored exists in the cache memory;
when the data to be stored exists in the cache memory according to the judgment, generating a first error correcting code on the basis of the data other than the data to be stored that was read out from the cache memory with the search of the cache memory, and keeping the generated first error correcting code;
generating a second error correcting code on the basis of the data to be stored in the buffer;
generating an error correcting code for the data by merging the first error correcting code and the second error correcting code;
performing a judgment as to whether a store address in a preceding store instruction corresponds to a store address in a current store instruction, and a judgment as to whether a data width of the data in the current store instruction corresponds to a predetermined data width; and
when the preceding store instruction having a same store address and the data width of the store data in the current store instruction is smaller than the predetermined data width, setting ECC validity information showing whether the first error correcting code is appropriate as invalid, and associating and storing the ECC validity information with the data and the first error correcting code.

10. The non-transitory computer-readable storage medium according to claim 9, wherein
the step of storing the ECC validity information comprises performing a judgment as to whether the same address exists in a plurality of the buffers and whether a data width of the data in the current store instruction correspond to the predetermined data width, and when the same store address exists in the plurality of the buffers and the data width of the data in the current store instruction is smaller than the predetermined data width, setting the ECC validity information as invalid, associating and storing, in the store address in a corresponding buffer, the ECC validity information with the data and the first error correcting code.

11. The non-transitory computer-readable storage medium according to claim 9, wherein
the step of generating the error correcting code comprises performing a judgment as to whether the ECC validity information is set as valid or invalid, and when the ECC validity information is set as valid, merging the first error correcting code and the second error correcting code to generate the error correcting code for the data.

12. The non-transitory computer-readable storage medium according to claim 9, wherein
the step of storing the ECC validity information comprises, when the preceding store instruction is completed while the ECC validity information of the buffer is set as invalid, changing the ECC validity information in the corresponding store address in the buffer to valid.

* * * * *